July 31, 1923.
M. L. GREENSTREET ET AL
ANIMAL TRAP
Filed Sept. 9, 1922
1,463,163
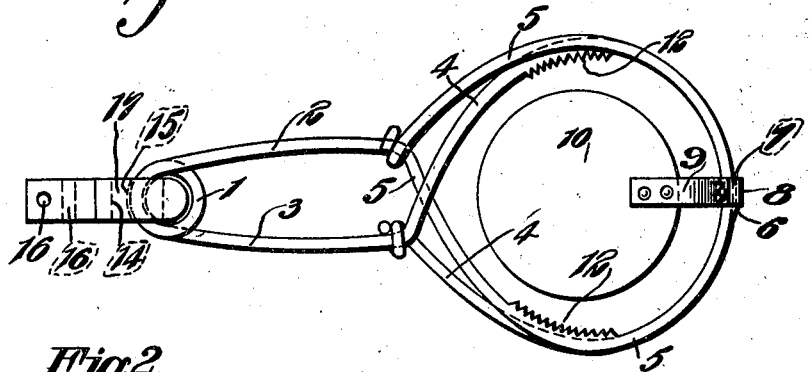
Fig.1.
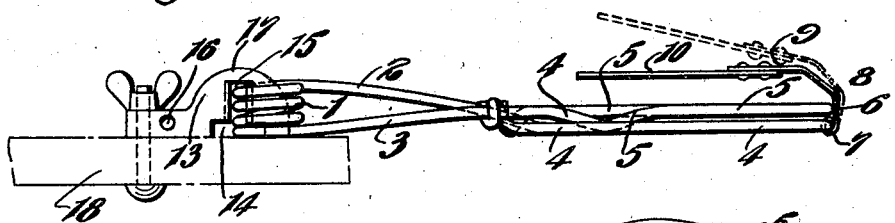
Fig.2.
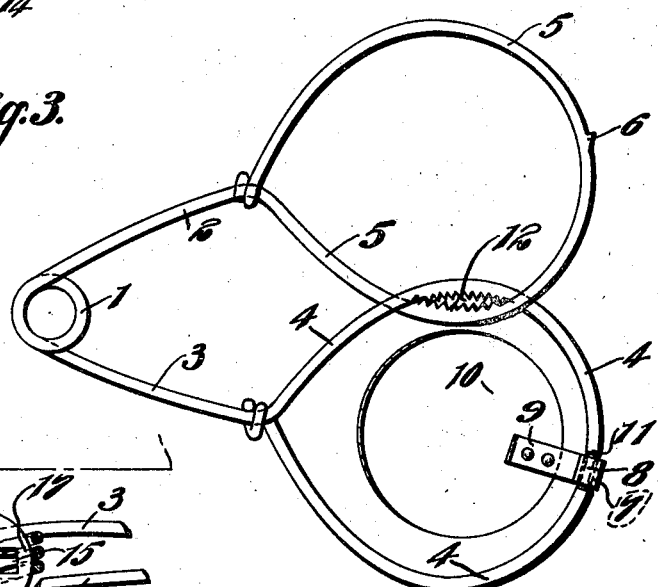
Fig.3.
Fig.4.
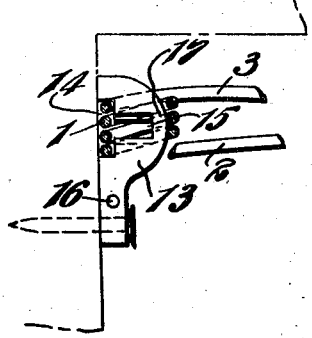
Inventors.
MILFRED L. GREENSTREET.
WALLACE DAY.
By F. R. Cornwall Atty.

Patented July 31, 1923.

1,463,163

UNITED STATES PATENT OFFICE.

MILFRED L. GREENSTREET AND WALLACE DAY, OF MAPLEWOOD, MISSOURI, ASSIGNORS OF ONE-THIRD TO MAY B. CORNWALL, OF ST. LOUIS, MISSOURI.

ANIMAL TRAP.

Application filed September 9, 1922. Serial No. 587,133.

*To all whom it may concern:*

Be it known that we, MILFRED L. GREENSTREET and WALLACE DAY, citizens of the United States, residing at Maplewood, St. Louis County, Missouri, have invented a certain new and useful Improvement in Animal Traps, of which the following is a full, clear, and exact description, such as will enable others skilled in the art to which it appertains to make and use the same, reference being had to the accompanying drawings, forming part of this application.

Our invention relates to animal traps and consists in an improved spring trap especially adapted to be placed over the entrance to the burrow of an animal.

The objects of our invention are to provide a trap adapted to be placed in such position which will be operated by the animal when it leaves the hole and will be inoperative by pressure from the upper or outer side. By this construction the trap may be placed over rat holes in poultry yards, for instance, and without danger to the poultry, although always set to entrap rats or other varmints entering the yard through the hole guarded by the trap.

In the accompanying drawings which illustrate a selected embodiment of our invention,—

Figure 1 is a top view of the trap when set.

Figure 2 is a side view of the trap when set.

Figure 3 is a top view of the trap when sprung.

Figure 4 is a fragmentary view showing a particular mounting of the trap.

The major portion of the trap is preferably formed from a single length of spring wire, the intermediate portion of which is coiled into a helical spring 1 and the terminal portions 2 and 3 of which diverge from each other substantially in a common plane and at their ends are bent to form interlinked rings 5 and 4, respectively.

On the exterior periphery of ring 5 at a point diametrically opposite spring 1, we provide a radial shoulder 6 forming a trigger catch. On the corresponding portion of the ring 4 a trigger is pivotally mounted, the trigger consisting of a ring-like portion 7 enclosing ring 4, a straight portion 8 extending tangentially of ring portion 7, and a straight portion 9 extending at right angles to portion 8. Portion 9 is enlarged or has attached thereto a flat disk 10 which, when the trap is set, substantially covers the area bounded by ring 4.

To prevent sliding movement of the trigger along ring 4, the latter is preferably formed with a depression 11 upon which the trigger is mounted. The portions of rings 5 and 4 which are opposed to each other when the trap is sprung are preferably provided with teeth 12 to more efficiently engage the neck of the animal caught therein.

It is obvious that the tendency of spring 1 is to thrust arms 2 and 3 away from each other. By compressing arms 2 and 3 the rings 4 and 5 may be superimposed one upon the other and when so positioned shoulder 6 will be engaged by the corresponding edge of the straight portion 8 of the trigger. Downward pressure upon disk 10 of the trigger only forces the straight portion 8 toward ring 5 and does not have any tendency to release the trap but very slight pressure upon the underside of disk 10 lifts straight portion 9 of the trigger and turning portion 8 upon ring 7 moves portion 8 away from spring 5, disengaging shoulder 6 and springing the trap.

The device is simple and economical to construct, it may be set with one hand as by holding the trap vertically with the rings 4 and 5 uppermost, the weight of the trigger tends to move it into projection engaging position, and after the trigger and projection are once engaged, the trap may be held in any position without being sprung.

To secure the trap in various positions so that it will not be pushed aside by transverse movement of the animal in the hole or by any accidental force applied from the outside, we provide an attaching member 13 having a longitudinal slot 14, and a transverse slot 15 each adapted to receive one side of spring 1 as shown in Figures 2 and 4, respectively. The base of member 13 has openings 16 disposed at right angles to each other and adapted to receive a screw, nail or other securing element. The back of member 13 is rounded at 17 to permit the insertion of the attaching member into spring 1 to the position shown in Figure 4.

The use of member 13 enables the trap to be secured against a wall although covering a hole in the floor or another wall, the latter arrangement being indicated in Figure 4 in which it should be noted that the trap is held edge downwards but out of contact with the floor if the same is near the hole to be covered.

In Figure 2, one end of a plank is indicated at 18 whereby the trap is held against accidental displacement. Other relative positions of the trap and attaching member will suggest themselves in each of which member 13 will function as described. In each of these positions a limited movement of the trap is possible whereby adjustment of the trap over the hole is possible.

Various modifications in the details of our invention may be made without departing from the spirit thereof as expressed in the appended claims.

We claim:

1. In an animal trap, a pair of rings adapted to be superimposed, means for thrusting said rings apart transversely of their axes, a radial shoulder formed on one of said rings facing in the direction of movement of said ring, a trigger pivoted to the corresponding portion of the other ring having an edge facing in the direction of movement of the ring and adapted to engage said shoulder when said rings are superimposed, and an element on said trigger, extending over the center of the ring, to be engaged by an animal passing through the ring in one direction only to disengage said trigger from said shoulder.

2. In an animal trap, a coil spring having straight terminal portions which diverge from each other in a plane at right angles to the spring axis, interlinked rings formed upon the ends of said portions, a radial shoulder formed on the outer periphery of one of said rings diametrically opposite said spring and facing the direction in which said spring tends to move that ring, a depression in the corresponding part of the other of said rings, a trigger coiled about the depressed portion of the latter ring and held thereby against sliding movement along the ring and having an edge facing the direction said spring tends to move that ring and adapted to engage said shoulder when said spring is compressed to superimpose the rings, and a member formed on said trigger and extending over the center of said rings to be engaged by an animal passing through the rings in one direction only to disengage said trigger from said shoulder.

3. In combination, a trap including a spring coil and an attaching member insertable within said coil and having a recess adapted to receive a portion of said coil to retain the trap in a desired position relative to a mounting surface.

4. In combination, a trap including a spring coil and an attaching member insertable within said coil and having a plurality of recesses disposed angularly to each other, each adapted to receive a portion of said coil so as to retain the trap in any one of several different positions relative to a mounting surface.

5. In combination, a trap lying substantially in a plane and including a spring coil member, and an attaching member having a face to be fitted against a mounting surface, a recess in said face adapted to receive a portion of said coil, a recess disposed transversely of said first-mentioned recess and similarly adapted, the back of said recessed portion being rounded so that the member may be inserted within the coil to receive the latter in either recess with said face presented at different angles to the plane of the trap.

In testimony whereof we hereunto affix our signatures this 2nd day of September, 1922.

MILFRED L. GREENSTREET.
WALLACE DAY.